United States Patent
Richardson et al.

(10) Patent No.: US 9,767,177 B1
(45) Date of Patent: *Sep. 19, 2017

(54) SYSTEM AND METHOD FOR OPTIMIZING DATA RECOVERY IN A PARALLEL DATABASE

(71) Applicants: Craig Patrick Richardson, Ashburn, VA (US); James Wesley Seaman, Falls Church, VA (US); Elizabeth Marie Charboneau, Reston, VA (US)

(72) Inventors: Craig Patrick Richardson, Ashburn, VA (US); James Wesley Seaman, Falls Church, VA (US); Elizabeth Marie Charboneau, Reston, VA (US)

(73) Assignee: FEDERAL HOME LOAN MORTGAGE CORPORATION, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,271

(22) Filed: Oct. 22, 2012

Related U.S. Application Data

(63) Continuation of application No. 11/090,484, filed on Mar. 28, 2005, now Pat. No. 8,296,271.

(51) Int. Cl.
  *G06F 17/30* (2006.01)
(52) U.S. Cl.
  CPC ............... *G06F 17/30575* (2013.01)
(58) Field of Classification Search
  CPC ................................................ G06F 17/30227
  USPC .................................................. 707/684, 764
  See application file for complete search history.

(56) References Cited

U.S. PATENT DOCUMENTS

| | | | |
|---|---|---|---|
| 6,289,355 B1 | 9/2001 | Haderle et al. | |
| 7,277,905 B2 * | 10/2007 | Randal | G06F 17/30315 |
| | | | 707/648 |
| 7,359,921 B1 | 4/2008 | Richards | |
| 7,631,020 B1 | 12/2009 | Wei et al. | |
| 7,814,272 B2 | 10/2010 | Barrall et al. | |
| 8,095,511 B2 * | 1/2012 | Zwilling | G06F 11/1451 |
| | | | 707/649 |

(Continued)

OTHER PUBLICATIONS

Lundquist, Carol, and Frieder, Ophir, and Grossman, David. A Parallel Relational Data base Management System Approach to relevance Feedback in Informatin Retrieval. Journal of the American Society for Intormation Science, 1999.

(Continued)

*Primary Examiner* — Robert Beausoliel, Jr.
*Assistant Examiner* — Alexandria Bromell
(74) *Attorney, Agent, or Firm* — Oblon, McClelland, Maier & Neustadt, L.L.P.

(57) ABSTRACT

A method and system for data recovery in a parallel database system in which data stored in the database has been corrupted by a transaction or operation. Transaction log files corresponding to each node of the parallel database are scanned to determine an operation that caused the corruption of the stored data. Information corresponding to the corrupted data before the operation causing the corruption is then generated based on the scanned transaction log. The operation responsible for corrupting the data is then rolled back, and the corrupted data is replaced with the original data stored in the database prior to the corruption.

20 Claims, 5 Drawing Sheets

(56) References Cited

U.S. PATENT DOCUMENTS

| | | | |
|---|---|---|---|
| 2002/0007363 A1* | 1/2002 | Vaitzblit | G06F 11/1471 707/707 |
| 2002/0091718 A1* | 7/2002 | Bohannon | G06F 11/1471 707/707 |
| 2004/0098371 A1* | 5/2004 | Bayliss | G06F 17/30545 707/707 |
| 2004/0243841 A1* | 12/2004 | Stumpf et al. | 713/201 |
| 2005/0010618 A1* | 1/2005 | Hayden | G06F 3/0601 707/707 |
| 2005/0076264 A1 | 4/2005 | Rowan et al. | |
| 2005/0131853 A1* | 6/2005 | Sampath | G06F 11/1471 707/707 |
| 2005/0251540 A1 | 11/2005 | Sim-Tang | |
| 2006/0047925 A1* | 3/2006 | Perry | G06F 11/1474 711/162 |
| 2006/0047999 A1 | 3/2006 | Passerini et al. | |
| 2006/0129612 A1 | 6/2006 | MacCormick et al. | |
| 2006/0200501 A1* | 9/2006 | Holenstein | G06F 17/30581 707/707 |
| 2006/0218206 A1* | 9/2006 | Bourbonnais | G06F 17/30377 707/707 |
| 2007/0226279 A1* | 9/2007 | Barton | G06F 11/1464 707/707 |
| 2008/0294648 A1* | 11/2008 | Lin | G06F 17/30362 707/707 |
| 2012/0101990 A1* | 4/2012 | Holenstein | G06Q 10/087 707/615 |

OTHER PUBLICATIONS

Sabaratnam, Maitrayi, and Torbjornsen, Oystein. Cost of Ensuring Safety in Distributed Database Management Systems. Proceedings of the 1999Pacific Rim International Symposium on Dependable Computing, 1999.

* cited by examiner

SYSTEM AND METHOD FOR OPTIMIZING DATA RECOVERY IN A PARALLEL DATABASE

CROSS-REFERENCE TO RELATED APPLICATIONS

This application is a continuation of and is based upon and claims the benefit of priority under 35 U.S.C §120 for U.S. Ser. No. 11/090,484, filed Mar. 28, 2005. the entire contents of which are incorporated herein by reference.

BACKGROUND OF THE INVENTION

Field of the Invention

The present invention is directed to methods and computer-based systems for optimizing data recovery in a parallel database system.

Discussion of the Background

Many businesses today take advantage of relational database technology in order to store and access critical business data. Where a business stores a large quantity of disparate business data within a single database, the industry refers to such a data store as a data warehouse. Data warehousing has become very popular in that it allows a business to query data in many differing ways to learn new things with respect to customers, markets, trends, and even internal operations. Some of these large databases exist as serial entities where operations are performed between one computer (node), and one database instance (application and associated data in a single pool). The current trend, however, is for large corporate data warehouses to utilize parallel database management systems, (DBMS), whereby multiple nodes access relational data in parallel across multiple instances of the database. This allows for huge performance improvements, but also adds considerable operational complexity. One such area of complexity is in the area of data recovery in the event that a data loss or corruption occurs. The present invention addresses the field of data recovery in a parallel database environment.

All database systems are vulnerable to failures that can cause data loss or corruption. Commercial database systems (e.g., DB2, SQL Server, Oracle, Sybase, etc.) typically provide a mechanism by which data can be restored in the event of a failure. Most commercial database systems restore data by utilizing the most recent backup copy of the database in conjunction with the database's transaction log. In order to accomplish data restoration using the traditional roll-forward mechanism, the database management software typically utilizes backups of a full image database and transaction logs. A transaction log is a file that records all changes to table data since the last full image database backup. The transaction logs capture the state of the database before and after changes are made. Transaction logs contain less information than databases, and are thus backed up more frequently than databases. In a typical database system, many transaction log backups would occur between each successive full image database backup. Further, as discussed above, in a parallel database system, such logs are generated for each node interacting with the database and stored independently and then indexed to the database catalog.

Although parallel databases are becoming increasingly popular due to the amount of data that they can support and the speed at which queries can be processed, tools to manage recovery of table data in these databases are immature and insufficient. Currently, technical staffs supporting such environments are forced to recover the entire database tablespace to a specific point-in-time via some external back-up media, such as tape, before recovery of specific lost or corrupted data can be accomplished. This recovery method is commonly referred to as "roll-forward recovery".

Many prior art database reconstruction techniques follow the procedure detailed below. These prior art reconstruction techniques restore the database by using the most recent full image backup. The database is then "rolled forward" to a point in time, just prior to the time of the failure, by reapplying every transaction from each transaction log backup file saved since the last full image database backup. This procedure effectively restores the database to the state in which it existed just prior to the database failure.

These traditional backup and recovery techniques are designed to protect data from hardware and media failures, such as disk crashes. In a typical database system, however, a more likely cause of data corruption is a user or application error. An incorrectly formed ad-hoc query or an application software error may inappropriately delete or modify data in the database. Traditional restore and roll-forward mechanisms are sub-optimal and inefficient for recovering data from user or application errors.

In the first place, roll-forward reconstruction requires restoring a vast amount of data. The complete set of transactions that occurred since the last database backup, which must be reapplied during roll-forward recovery from a system failure, is typically much larger than a set of transactions that could be "rolled back," thereby correcting a user or application error. As recognized by the present inventors, "Undoing" a small set of erroneous transactions is a far more efficient method of restoring a database than is reapplying all valid transactions that occurred since the last database backup prior to a failure.

In addition, the traditional roll-forward mechanism restores the database by rolling forward a restored backup image to a specific point in time. When recovering from user or application errors, this point in time is chosen to be the start time of an erroneous transaction that corrupted the database. By rolling the database forward to this particular point in time, the traditional mechanism effectively removes all transactions that may have occurred after the start of the erroneous transaction. By only rolling forward to the beginning point of the erroneous transaction, many transactions that occurred subsequent to the error, but that may have nonetheless have been valid transactions wholly independent of the specific database failure, are lost.

Some database systems (e.g., DB2, Microsoft SQL Server, Oracle) provide a recovery feature in which a "restore and roll-forward" may be performed on an individual table basis. Although to some extent this feature mitigates the inefficiency of the roll-forward method described above, it is still not sufficiently granular to permit the selection of erroneous transactions only. Also, since very large tables are common in data warehouses, the size of the tables may further limit the efficiency of the roll-forward procedure. Furthermore, this feature applies the selectivity criteria at the database object level, not the transaction level, resulting in recovery of only coarse-grained database objects, such as a table. None of the prior art restore and roll-forward methods allow recovery of fine-grained objects, such as an individual row within a table.

In view of the above-mentioned deficiencies, the present inventors have discovered there is a need for a method and apparatus for restoring a database that mitigates the inefficiencies of traditional roll-forward techniques, while simultaneously allowing recovery of fine-grained objects.

SUMMARY OF THE INVENTION

The present invention adds logic to existing parallel database management systems such that data contained in the database logs and catalog is accessed in order to recover lost or corrupted table data without the need for roll-forward recovery. Using this data with the algorithm disclosed herein, the database manager or other such database logical entity is capable of recovering database table data to a consistent state without the need to restore from tape or other alternate restoration media. In addition, the algorithm provides decision logic such that the database manager is capable of choosing the best recovery point for the database table-space, or can display several optional recovery points for the database administrator (DBA) or user to choose from.

The present invention is directed to a system and method for reconstructing database objects using transaction-selective rollback. Transaction-selective rollback is a technique used to undo a transaction, or series of transactions, performed on a database table space. The transaction-selective rollback system and method of the present invention reverses erroneous transactions by using information stored in transaction logs. Most commercially available databases compile logs of all transactions performed on the database.

More specifically, a Log Scanner function allows the DBMS to scan individual node transaction logs, transaction catalog, back-up file history, or other necessary logs or files to determine the optimal point to which the database should be reverted, or "rolled back." The Log Scanner allows a DBMS to perform queries over the scanned transaction logs and determine the exact operation, or query that resulted in a corruption of data. This information is then transmitted to the Rollback Manager, which allows the DBMS to perform specific tasks when recovering from data corruption or loss.

The Rollback Manager receives results from the Log Scanner and acts as an interface allowing the DBA to manage the rollback process. The Rollback Manager uses the received results to display optional and/or optimal transaction recovery points for rolling back to a specific operation or transaction that is performed on the data. The Rollback Manager also allows the DBA to rollback selected tables or selected table space in the database to a particular point of time upon command. The DBA may also use the Rollback Manager to manage the table data deletion and repopulation that takes place when a transaction within the database is rolled back.

The log discussed above, referred to as a transaction log, may vary slightly from database to database in terms of the format of the log or the type of information contained therein. While the embodiments disclosed herein are described by using a parallel DB2 database implementation as exemplary, it should be noted that the present invention is equally applicable to other databases, e.g., Oracle, SyBase, Microsoft SQL, and the like. Before discussing the embodiments of the present invention, the concept of transaction logs generally is discussed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
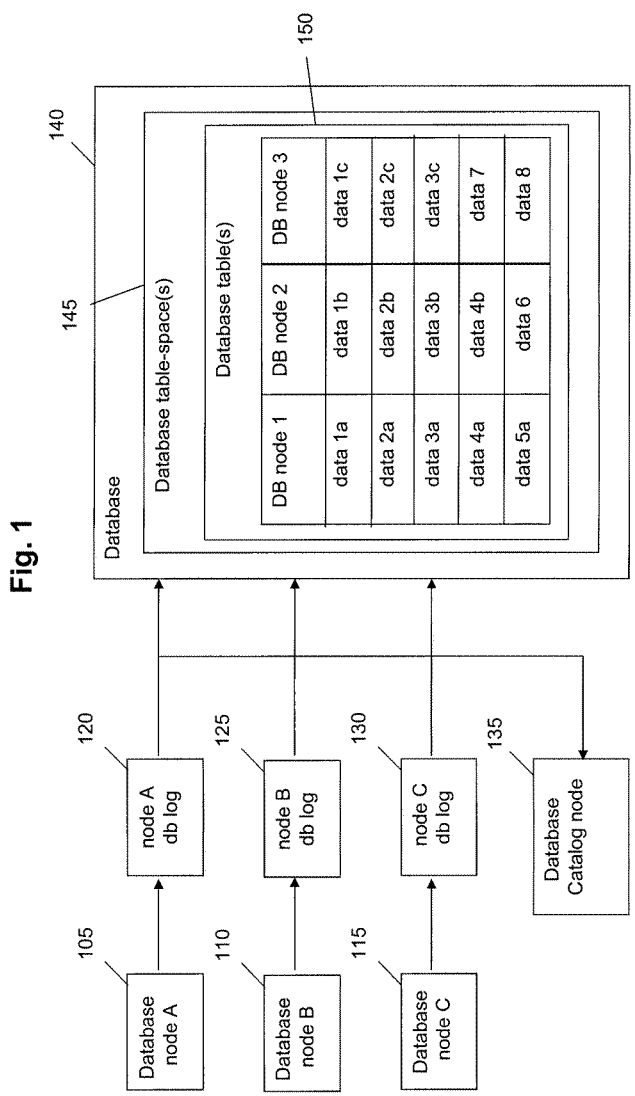
FIG. 1 is a block diagram illustrating the components of a parallel database system according to one embodiment of the present invention.

Referring now to the drawings, wherein like reference numerals designate identical or corresponding parts throughout the several views.

When table data becomes corrupted or lost, current embodiments of parallel DBMS systems require that the data for the affected table-space be restored to a known good point in time, typically through the manual process of restoring from a tape back-up and then rolling forward with the transaction logs to the latest consistent state. When dealing with very large tables commonly found in data warehouse environments, this can be very time consuming. Additionally, if only a subset of table-space data has been compromised or lost, it is very inefficient to restore the entire table-space. FIG. 1 depicts the basic components of a parallel database in which the present invention is implemented. A table is generally defined as a two-dimensional arrangement of rows and columns and holds data, and the context of this description includes the entirety of data supported by the parallel database system. It should also be noted that the method and system described herein may be implemented in a database system that is not parallel in nature. The recovery method is also described in reference to a DB2 database system. However, the method may be implemented in any other currently available database system such as SQL Server, Oracle, or Sybase, for example. An example of the implementation of the DB2 database system is disclosed in IBM's "*Data Recovery and High Availability Guide and Reference, Version* 8", published in 2002, the entire contents of which is incorporated herein by reference.

In a parallel database environment, work is divided among a number of database nodes 105-115, each of which performs a subset of the complete unit of work in the form of database 140. It should be noted that the number of nodes shown is for illustrative purposes only and that the system may be implemented with many more or fewer nodes as appropriate for the amount of data to be modified, edited or deleted in the database. It should also be noted that the complete data warehouse may consist of more than just a single database 140, and may also include a plurality of databases which may be similarly configured.

As an example, in FIG. 1 above, database node A 105 updates "data 1a", node B 110 updates "data 1b", and node C 115 updates "data 1c", to complete the unit of work "row update 1a-1b-1c". Non-parallel units of work may also exist, as in the example above, only database node B 110 updated "data 6". As modifications of a database table are made, each node records the changes in its current database transaction log file in each of the respective node logs 120-130. When complete units of work are committed in a table-space, a consistent point in time is established and the catalog node (or catalog) 135 is updated with this information. In the example above, the latest possible consistent point in time would be represented by row 3 containing "data 3a-3b-3c". In the following row, node 3 has not yet written "data 4c", such that the unit of work is not complete and cannot be committed to the table-space. The present invention will take advantage of existing data in the catalog 135 and individual transaction log files 120-130 in order to enable rapid recovery of table data, and will be discussed in more detail below.

Each of the nodes 105-115 includes a corresponding node log 120-130, which track and maintain modifications, edits or deletions performed to the database tables 150, by the respective nodes 105-115. Information regarding the nature of the modification, the time the modification has taken place and the data in the table before and after the modification, and other pertinent information regarding activities by the nodes is stored in the transaction logs 120-130. A catalog node 135 may also be provided which retrieves the lists of transactions preformed in each of the node logs 120-130, and references the lists of transactions for a selected set of nodes 105-115. This process of tracking the transactions made by the logs will be described in greater detail below. The database 140 (or data store, or data warehouse) is comprised of the database tables 150 which are stored in the database table-space 145.

The nodes 105-115 may be computers or other similar computing devices as will be described in greater detail below in reference to FIG. 5. The node logs 120-130 may be any type of memory or other similar storage device configured to store data associated with the database nodes 105-115. The memory may be a hard disk within the database nodes 120-130 themselves, or may be an external storage device configured to capture the modification of data performed by the individual nodes respectively. Each of the nodes 105-115 is configured to communicate with the node logs 120-130 and the database 140 via a network or other data communication protocol suitable for communicating such data. For example, the database nodes may communicate with the database and/or the node logs 120-130 via TCP/IP (Transmission Control Protocol/Internet Protocol), but any other desirable network protocol such as, for example IPX/SPX (Internet Packet Exchange/Sequential Packet Exchange), NetBEUI (NetBIOS Extended User Interface), or NetBIOS (Network Basic Input/Output System) is possible.

Most commercial database systems support the concept of transaction logging. Using DB2 databases as an example, a transaction is a user-defined sequence of one or more commands. The database performs each user transaction as an atomic unit of work. An atomic transaction either fully succeeds or fully fails and may not produce partial results. If a transaction succeeds, then all commands within this transaction are guaranteed to succeed. If a transaction fails, then all partial results are undone, and the database is reverted to the state in which it existed before the failed transaction ran.

Illustratively, suppose a transaction consists of two commands: insert a row into table X and insert a row into table Y. Further suppose that while performing this transaction, the database system successfully inserts a row into table X. But before it has inserted a row into table Y, a power failure occurs. In this case, when the power is restored, the database software identifies the failed transaction as only partially successful and removes the inserted row from table X. Thus the database is reverted to its original state, as though the failed transaction never ran.

Database systems commonly employ transaction logs in order to provide transaction autonomy. A transaction log is a file that records the state of the database before a modification is made and the state of the database after the modification has been made. Any user and system activity that results in data modification is recorded in the log. The log enables the database system to reapply or reverse any data modification.

A transaction sequence begins with a log record whose operation parameter indicates that a transaction has started. A transaction sequence is terminated with a log record whose operation parameter indicates the disposition of all operations within this sequence. If the entire transaction is successfully committed, the operation code reflects a commit otherwise it indicates that the transaction has been aborted. Every transaction sequence is uniquely identified by a transaction identifier (transaction ID) assigned by the database system. A transaction ID field is present in every log record. Log records having the same value in the transaction ID field belong to the same transaction sequence and every log record is uniquely identified by a log identification number (log ID). A log ID may be used to locate a record in the physical log file.

Figure 2:
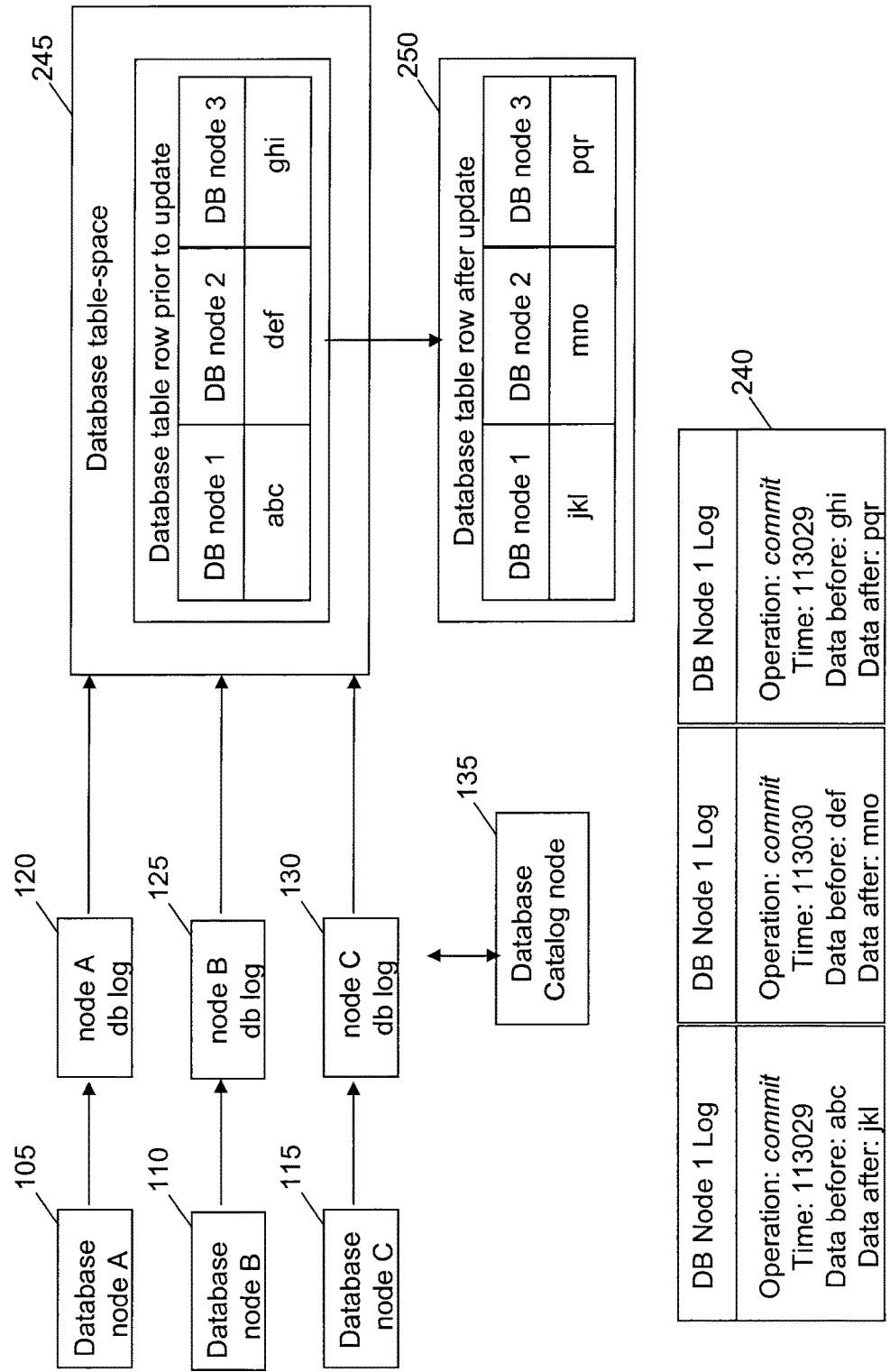
FIG. 2 is a block diagram illustrating a row update operation in a parallel database and the corresponding transaction log that is maintained.

The present invention provides new and unique parallel database table-space recovery through a "rollback" function. This rollback function is enabled through the use of recovery logic in conjunction with existing catalog data and transaction logs. FIG. 2 provides an overview of functional elements involved in a parallel DBMS transaction.

FIG. 2 depicts a sample update transaction, where one row of data, "abc-def-ghi" 245, is updated with the new data "jkl-mno-pqr" 250. In this example, the last transaction associated with the unit of work completed at time stamp "113030", which becomes a valid recovery point for a rollback function. The log 240 for such a transaction has been simplified to depict only the time and nature of the change; however, depending on the database system employed, the logs may have many more parameters. In the event that this update was a mistake, or that the data was not valid, the change that was made would be rolled back and the original row "abc-def-ghi" would be restored. This is, of course, a simplistic example intended to demonstrate how the present art could function. A more realistic example would likely include hundreds or thousands of affected rows or columns, possibly in multiple tables within a table-space, and could require use of transaction logs other than just the current active transaction logs.

Restoring deleted table data, (commonly referred to as truncated data), would be similar to the update example provided, where the transaction logs would contain the "Data before" field containing the original data, and the "Data after" field would be null. Specific DBMS systems may use different or additional logging files, such as back-up history files; however, the rollback algorithm in the present art can be applied regardless of which specific log files are scanned.

The user or DBA may also optionally be capable of specifying the parameters used to scan the log data when deciding which transactions, or to what point all transactions, should be rolled back. In these embodiments, a user may specify the logs or history to be scanned by the Log Scanner, then determine, based on these results, the step to which the database should be rolled back. A Rollback Manager function, or algorithm, then receives the results from the scan and allows a database administrator to coordinate the rollback. Specifically, the Rollback Manager is able to receive the scan results from the Log Scanner, display optional transaction recovery points and coordinate rollbacks to a specified point in time and manage the table data delete/population functions.

In the context of database reconstruction, the database administrator will typically have information regarding which transactions are likely to be erroneous. For example, it may be the case that a particular user, User X, executed a series of erroneous transactions on the database. In this example, all other transactions executed by the numerous users accessing the database are presumed valid and should remain intact. The present invention could be used to undo only the transactions performed by User X. Similarly, the user of the present invention may wish to undo all transactions occurring within a specific timeframe, irrespective of which user executed the specific transaction.

Figure 3:
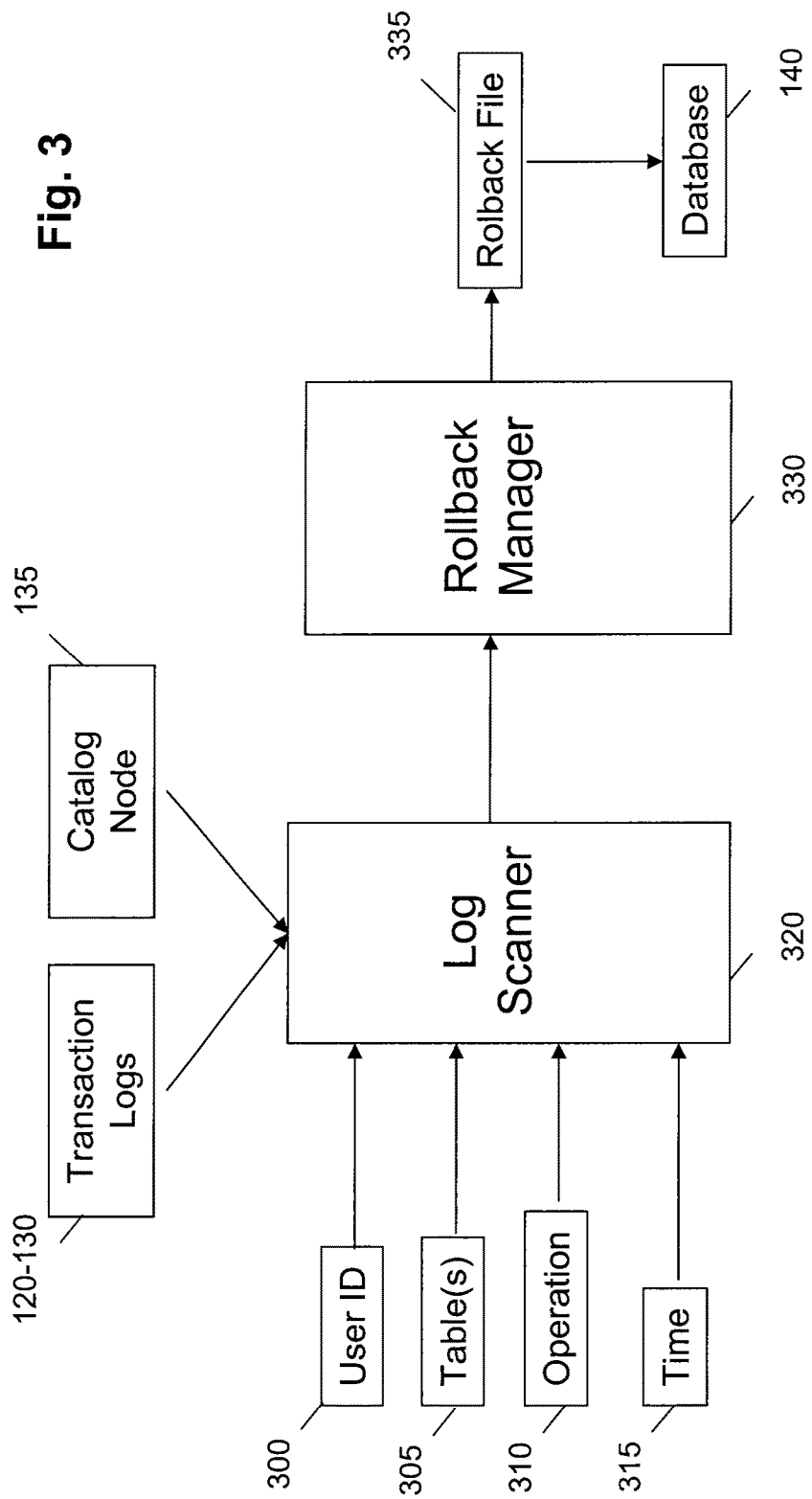
FIG. 3 is a block diagram illustrating an overall system configuration according to one embodiment of the present invention.

FIG. 3 shows a list of the parameters that could be used in various embodiments to determine which transactions to scan and decide whether to rollback via the Rollback Manager. The structure depicted in FIG. 3 is generalized so as to be conceptually applicable to both method and system embodiments of the present invention. With reference to FIG. 3, a user identification (User ID) 300 parameter is provided which allows the database administrator (DBA) or user to scan the transaction logs for specified User Identification (User ID), uniquely distinguishing each user accessing the database. Therefore, should a specified user be identified as having caused the data corruption, the log files can be scanned for all operations performed by that user. The Tables 305 parameter identifies one or more specific transaction logs corresponding to specific tables within a database that the Log Scanner might scan to determine a list of recent transactions. If the specific table or tables of the modified data are known, then this parameter may be useful to view all operations performed on that specific table space over a given period of time.

The Operation 310 parameter allows a user to scan all transactions of a specific type, e.g., all "insert row" or "delete" transactions. Databases typically perform three types of activities: insert row, modify row, or delete which may be referred to hereinafter simply as an operation or operations. As such, the Operation 310 parameter would correspond to one of these above-mentioned parameters. The Time 315 parameter allows a DBA to scan and/or subsequently rollback transactions occurring within a specified time range. The Time 315 parameter can be a closed loop parameter, i.e., scan all transactions between two points in time, or can be open-ended on one end, i.e., scan all transactions occurring before or after a specified time.

Once these scan parameters have been chosen, the Log Scanning algorithm 320 scans the individual node transaction logs 120-130, the catalog 135, and any additional files for transactions that meet the selected scanning parameters. This information is then communicated to the Rollback Manager algorithm 330, which will display optional transaction recovery points, coordinate rollback across nodes based on the results of the scanned transaction logs, and ultimately manage the table deletion/population based on the selected rollback function selected by the user. It should be noted that the Log Scanner and Rollback Manager may be implemented as a single software algorithm or may be separate algorithms located within the same processing mechanism or in separate mechanisms. They may also be implemented individually or together in accordance with the computer processing device described in reference to FIG. 5.

The Rollback Manager and Log Scanning module, as well as additional algorithms disclosed herein, could be written in C++ or similar programming language. In order to reconstruct the relevant transactions, the Rollback Manager algorithm 330 receives the set of pertinent log records from the Log Scanner 320 in the form of transaction logs or operations performed on the database, which match the specified parameters discussed above. This information is then forwarded to the Rollback Manager 330, thus allowing the appropriate database operations to be performed for Rollback.

The Rollback Manager 330 assimilates the data received from the Log Scanner 320 and provides an interface for the DBA to select the point to which the data in the database should be rolled-back and subsequently manages the rollback of the data. Specifically, the Rollback Manager 330 computes changes that are applied to the current database to revert affected objects, or tables or data back to the state in which they existed prior to the erroneous transactions. The changes are used to generate standard commands that are written into a single file referred to as a Rollback File 335. The Rollback File 335 may be a sequence of standard commands that are applied to the database 140 in order to undo the erroneous transactions, or any transactions which the DBA or a user wishes to undo.

In further embodiments of the present invention, the general steps of the Log Scanner 320 and the Rollback Manager 330 outlined above, i.e., using parameters to extract appropriate log records from the transaction logs, and computing the changes necessary to perform reconstruction, are performed differently depending upon which parameters are selected.

Figure 4:
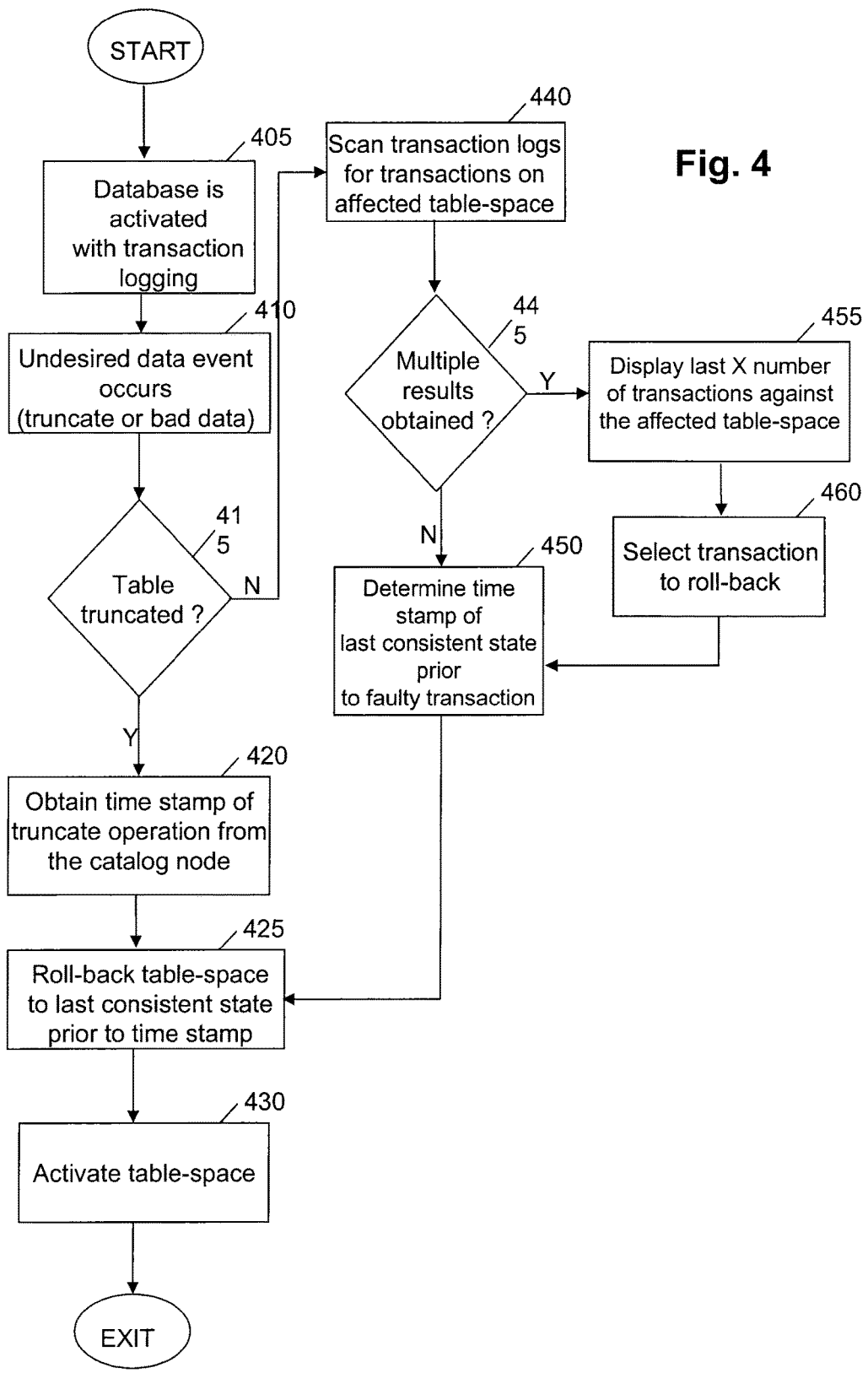
FIG. 4 is a flowchart illustrating the steps performed in identifying and rolling back an operation according to one embodiment of the present invention.

FIG. 4 depicts a flowchart illustrating the steps performed in a database rollback process according to one embodiment of the present invention. The process starts at step 405 with a parallel database which includes a plurality of transactions logs which store information associated with each operation performed on the database, as discussed above. At step 410 the DBA or a user is informed that an undesired data event has occurred affecting the contents of the database. As discussed above, the undesired event may include, but is not limited to, an unintended commit operation by a user resulting in undesired deletion, addition or modification of the data in the database. At step 415 the DBA or the Log Scanner determines that the information in the table has been truncated, or deleted by a user. If the data in the table has been truncated, then the Log Scanner determines the timestamp of the truncate operation from the catalog node 135 or any other scanned nodes, as discussed above. It should be noted that the DBA may also be capable of selecting an alternative parameter for scanning the data and determine which transaction is responsible for truncating the data based on one of these alternative parameters. Once the time stamp of the truncated operation is retrieved from the catalog node 135 at step 420, a rollback script is issued by the Rollback Manager 330, and the table is rolled back to the last consistent state prior to the time stamp. Once the table is rolled back to the last consistent state prior to the time stamp, the table space is again activated and available for use at step 430.

If at step 415 the table is determined not to have been truncated, the process moves to step 440. At step 440 the transaction logs are scanned by the Log Scanner 320 using one of the parameters above in order to find the table space which has been affected by the undesired event. If multiple table space results are not obtained, the time stamp of the last consistent state prior to the faulty transactions is retrieved at step 450. Once the last consistent state of the table is obtained, the process proceeds to step 425 and the table is rolled back to the last consistent state prior to the time stamp. However, if at step 445 the Log Scanner determines that multiple transactions have occurred to the affected table space, then the process proceeds to step 455. At step 455 the Rollback Manager displays the last transactions performed against the affected table space. The DBA or user is then able to select the transaction to which to rollback to at step 460, and the time stamp of this transaction is determined at step 450. The Rollback Manager then rolls back the table-space to the last consistent state prior to the time stamp of the transaction selected by the user at step 460.

The rollback script generated by the Rollback Manager 330 reverses Insert, Delete, and Modify operations. Intuitively, reversing an Insert operation involves deleting the inserted row, while reversing a Delete operation involves re-inserting the deleted row. Reversing a Modify operation involves rolling back the affected row by restoring all data to those values that existed before the update.

The rollback function accumulates all changes that are needed in order to reverse each operation in a temporary rollback table. The changes are recorded as full data row images that are either inserted or deleted from a corresponding table. For every operation that is reversed, the rollback function modifies this rollback table. These modifications vary depending upon the type of function being undone. If, for example, the rollback function reverses an Insert operation, it will record the full data row that is deleted in order to undo the Insert operation in the rollback table. Similarly, if the rollback function reverses a Delete operation, it adds a record to the rollback table containing the full data row that is inserted in order to undo the delete.

In order to undo a Modify operation, the Rollback Manager determines what the affected row looks like presently, what it looked before the Modify operation, and what it looked like after the Modify operation. Each of these images is encoded as a record and added to the rollback table and incorporated into the subsequent rollback script generated by the Rollback Manager 330.

Figure 5:
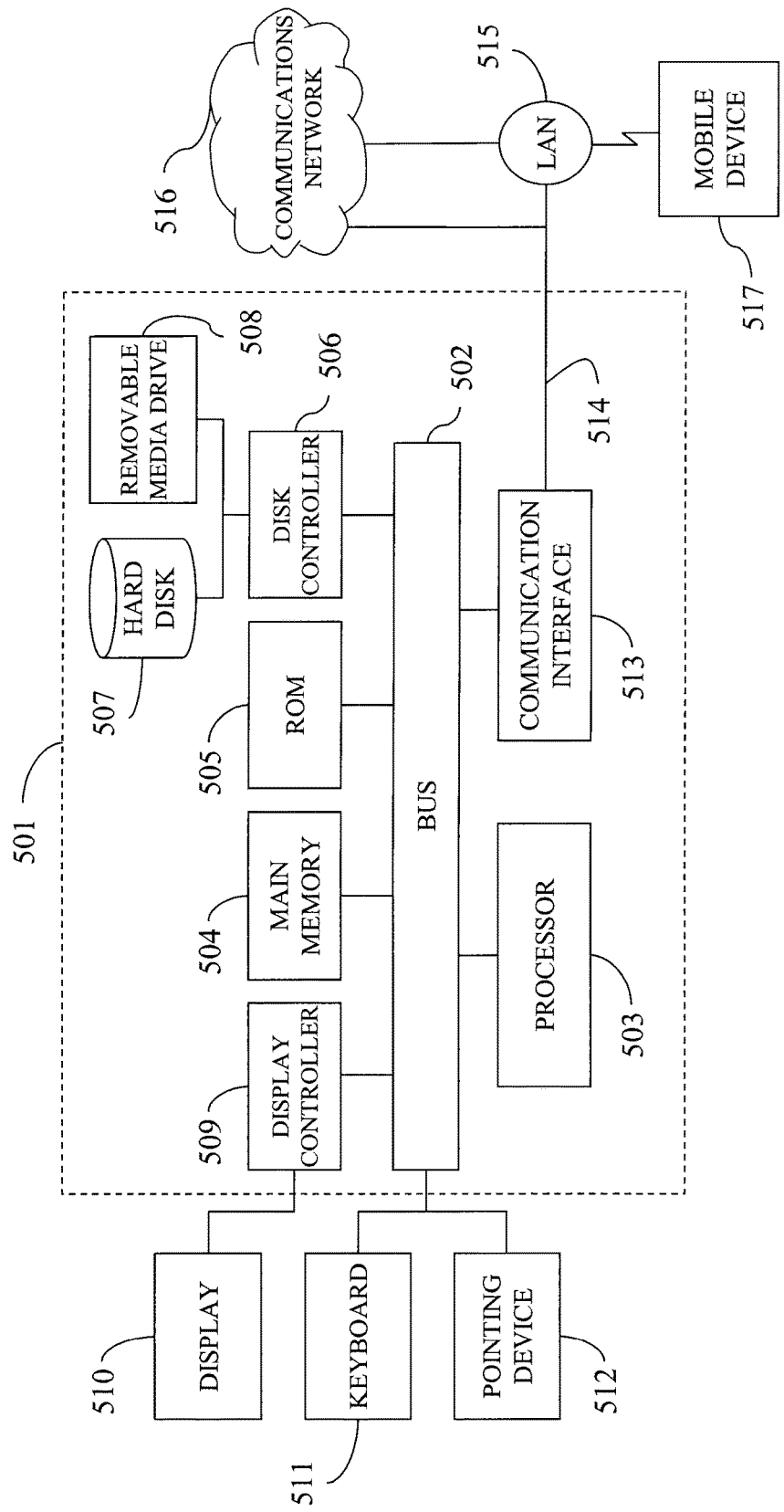
FIG. 5 is a block diagram illustrating a computer system that may be used to implement the present invention.

FIG. 5 illustrates a computer system 501 upon which an embodiment of the present invention may be implemented. It should be noted that the computer system discussed below may be used to implement any one of the above functions or components. The computer system 501 includes a bus 502 or other communication mechanism for communicating information, and a processor 503 coupled with the bus 502 for processing the information.

The computer system 501 also includes a main memory 504, such as a random access memory (RAM) or other dynamic storage device (e.g., dynamic RAM (DRAM), static RAM (SRAM), and synchronous DRAM (SDRAM)), coupled to the bus 502 for storing information and instructions to be executed by processor 503. In addition, the main memory 504 may be used for storing temporary variables or other intermediate information during the execution of instructions by the processor 503. The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 501 may also include a display controller 509 coupled to the bus 502 to control a display 510, such as a cathode ray tube (CRT), for displaying information to a computer user. The computer system includes input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing steps of the invention in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 501, for driving a device or devices for implementing the invention, and for enabling the computer system 501 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 503 for execution. A computer readable medium may take many forms, including but not limited to, non-volatile media, volatile media, and transmission media. Non-volatile media includes, for example, optical, magnetic disks, and magneto-optical disks, such as the hard disk 507 or the removable media drive 508. Volatile media includes dynamic memory, such as the main memory 504. Transmission media includes coaxial cables, copper wire and fiber optics, including the wires that make up the bus 502. Transmission media also may also take the form of acoustic or light waves, such as those generated during radio wave and infrared data communications.

Various forms of computer readable media may be involved in carrying out one or more sequences of one or more instructions to processor 503 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 501 may receive the data on the telephone line and use an infrared transmitter to convert the data to an infrared signal. An infrared detector coupled to the bus 502 can receive the data carried in the infrared signal and place the data on the bus 502. The bus 502 carries the data to the main memory 504, from which the processor 503 retrieves and executes the instructions. The instructions received by the main memory 504 may optionally be stored on storage device 507 or 508 either before or after execution by processor 503.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a network interface card to attach to any packet switched LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc). The signals through the various networks and the signals on the network link 514 and through the communication interface 513, which carry the digital data to and from the computer system 501 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA) laptop computer, or cellular telephone.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for data recovery in a parallel database, the method performed by a computer system including circuitry, the method comprising:
    determining, by the circuitry, whether data stored in a first database has been corrupted by a transaction, the first database being one of a plurality of databases in the parallel database;
    receiving, at a user interface of the computer system, a plurality of parameters, input by a user, corresponding to the transaction, the parameters including a user identification, an index for each database of the plurality of databases, a type of operation including at least one of an insert, edit and delete operation, and time information including at least one of two points in time and a specified range in time;
    for each of the inputted parameters, searching, by the circuitry, transaction log files corresponding to each database of the parallel database to determine at least one operation corresponding to the transaction that caused the corruption, the transaction including a respective one of the inputted parameters, the transaction log files including transaction information on the transaction, the transaction information including information about the at least one operation performed in the transaction on the first database, a particular user that performed the transaction, and system activity in the first database caused by the transaction;
    determining, by the circuitry, a time entry in the transaction log files prior to performance of the transaction, the time entry corresponding to a time when the first database has not been corrupted by the transaction and a time when state information for each database of the parallel database is recorded in the transaction log files; and
    rolling back the parallel database by reversing the at least one operation performed in the transaction to the first database by using the transaction information so as to revert data in the parallel database back to a state at the time corresponding to the time entry.

2. The method according to claim 1, wherein the at least one operation includes at least one of an erase, edit and modification of data in the first database.

3. The method according to claim 1, wherein the searching includes searching a database catalog node containing information relating to operations performed on the first database according to a plurality of nodes.

4. The method according to claim 1, wherein the searching includes searching a back-up history file which includes information relating to operations performed on the parallel database.

5. The method according to claim 1, wherein the transaction log files further include state information of the parallel database before the transaction and state information of the parallel database after the transaction.

6. The method according to claim 1, wherein the transaction log files further include a transaction identifier unique to the transaction that caused the corruption.

7. The method according to claim 6, wherein the plurality of parameters includes the transaction identifier.

8. The method according to claim 1, wherein the transaction log files further include time information that indicates when the transaction that caused the corruption took place.

9. The method according to claim 1, wherein the plurality of parameters includes the transaction information of the transaction log files.

10. A system for data recovery, comprising:
a parallel database including a plurality of databases; and
circuitry configured to
determine whether data stored in a first database has been corrupted by a transaction, the first database being one of the plurality of databases;
receive, via a user interface, a plurality of parameters, input by a user, corresponding to a transaction, the parameters including a user identification, an index for each database of the plurality of databases, a type of operation including at least one of an insert, edit and delete operation, and time information including at least one of two points in time and a specified range in time;
for each of the inputted parameters, search transaction log files corresponding to each database of the parallel database to determine at least one operation corresponding to the transaction that caused the corruption, the transaction including a respective one of the inputted parameters, the transaction log files including transaction information on the transaction, the transaction information including information about the at least one operation performed in the transaction on the first database, a particular user that performed the transaction, and system activity in the first database caused by the transaction;
determine a time entry in the transaction log files prior to performance of the transaction, the time entry corresponding to a time when the first database has not been corrupted by the transaction and a time when state information for each database of the parallel database is recorded in the transaction log files; and
roll back the parallel database by reversing the at least one operation performed in the transaction to the first database by using the transaction information so as to revert data in the parallel database back to a state at the time corresponding to the time entry.

11. The system according to claim 10, wherein the circuitry is further configured to perform at least one of an erase, edit and delete operation on the data.

12. The system according to claim 10, wherein the circuitry is further configured to search at least one of a catalog node and a back-up file history, each of which are configured to store the transaction log files relating to operations performed on the parallel database over a predetermined period of time.

13. The system according to claim 10, wherein the at least one operation includes at least one of an erase, edit and modification of data in the first database.

14. The system according to claim 10, wherein the searching performed by the circuitry includes searching a database catalog node containing information relating to operations performed on the first database according to a plurality of nodes.

15. The system according to claim 10, wherein the transaction log files further include state information of the parallel database before the transaction and state information of the parallel database after the transaction.

16. A non-transitory computer readable storage medium storing computer executable instructions which, when executed by a computer, causes the computer to:
determine whether data stored in a first database has been corrupted by a transaction, the first database being one of a plurality of databases in a parallel database;
receive, at a user interface of the computer, a plurality of parameters, input by a user, corresponding to the transaction, the parameters including a user identification, an index for each database of the plurality of databases, a type of operation including at least one of an insert, edit and delete operation, and time information including at least one of two points in time and a specified range in time;
for each of the inputted parameters, search transaction log files corresponding to each database of the parallel database to determine at least one operation corresponding to the transaction that caused the corruption, the transaction including a respective one of the inputted parameters, the transaction log files including transaction information on the transaction, the transaction information including information about the at least one operation performed in the transaction on the first database, a particular user that performed the transaction, and system activity in the first database caused by the transaction;
determine a time entry in the transaction log files prior to performance of the transaction, the time entry corresponding to a time when the first database has not been corrupted by the transaction and a time when state information for each database of the parallel database is recorded in the transaction log files; and
roll back the parallel database by reversing the at least one operation performed in the transaction to the first database by using the transaction information so as to revert data in the parallel database back to a state at the time corresponding to the time entry.

17. The non-transitory computer readable storage medium according to claim 16, wherein the at least one operation includes at least one of an erase, edit and modification of data in the first database.

18. The non-transitory computer readable storage medium according to claim 16, wherein the computer is further caused to search a database catalog node containing information relating to operations performed on the first database according to a plurality of nodes.

19. The non-transitory computer readable storage medium according to claim 16, wherein the computer is further caused to search a back-up history file which includes information relating to operations performed on the database system.

20. The non-transitory computer readable storage medium according to claim 16, wherein the transaction log files further include state information of the parallel database before the transaction and state information of the parallel database after the transaction.

\* \* \* \* \*